US005670575A

United States Patent [19]

Flexman, Jr.

[11] Patent Number: 5,670,575
[45] Date of Patent: Sep. 23, 1997

[54] LOW TEMPERATURE TOUGHENED POLYAMIDES

[75] Inventor: Edmund Arthur Flexman, Jr., Wilmington, Del.

[73] Assignee: E. I. Du Pont de Nemours and Company, Wilmington, Del.

[21] Appl. No.: 551,362

[22] Filed: Nov. 1, 1995

Related U.S. Application Data

[63] Continuation of Ser. No. 197,088, Feb. 16, 1994, abandoned.

[51] Int. Cl.$^6$ ............................................ C08L 77/00
[52] U.S. Cl. .................................. 525/66; 325/179
[58] Field of Search ............................ 525/66, 179

[56] References Cited

U.S. PATENT DOCUMENTS

| 4,174,358 | 11/1979 | Epstein | 525/183 |
| 4,346,194 | 8/1982 | Roura | 525/66 |
| 4,410,661 | 10/1983 | Epstein et al. | 525/66 |
| 4,594,386 | 6/1986 | Olivier | 525/66 |
| 5,010,136 | 4/1991 | Ohmae et al. | 525/66 |
| B1 4,174,358 | 8/1992 | Epstein | 525/183 |

FOREIGN PATENT DOCUMENTS

| 0 034 704 A1 | 9/1981 | European Pat. Off. | C08L 77/00 |
| 0 364 897 A2 | 4/1990 | European Pat. Off. | C08L 23/10 |
| 0 375 389 A1 | 6/1990 | European Pat. Off. | C08L 77/00 |
| 0 382 539 A1 | 8/1990 | European Pat. Off. | C08L 77/00 |
| 0 488 119 A3 | 6/1992 | European Pat. Off. | C08L 101/00 |
| 1241361 | 8/1971 | United Kingdom | 525/66 |

*Primary Examiner*—Ana Woodward
*Attorney, Agent, or Firm*—James A. Forstner

[57] ABSTRACT

A toughened polyamide blend which exhibits improved toughness at exceptionally low temperatures can be prepared from:

(A) 60 to 90 weight percent of a polyamide matrix resin; and (B) 10 to 40 weight percent of a rubber component including:

(1) a functionalized rubber selected from ethylene/propylene copolymers and ethylene/propylene/diene terpolymers, and (2) an ethylene copolymer of the formula E/X/Y wherein E is a radical formed from ethylene and is 40 to 90 weight percent of the ethylene copolymer, X is an acrylate ester of an alcohol having 1 to 10 carbon atoms and is 10 to 80 weight percent of the ethylene copolymer, and Y is selected from glycidyl methacrylate and glycidyl acrylate and is 0.5 to 10 weight percent of the ethylene copolymer.

7 Claims, No Drawings

LOW TEMPERATURE TOUGHENED POLYAMIDES

This is a continuation-in-part of application Ser. No. 08/197,088 filed Feb. 16, 1994, now abandoned.

BACKGROUND OF THE INVENTION

The present invention relates to polyamide compositions which exhibit particularly good properties, including toughness and ductility, at exceptionally low temperatures.

Improvement of impact strength of polyamide resins has long been of interest. Resistance to shattering or brittle breaking on impact of polyamide molded articles is a desirable feature of any molded article. Tendency to break on impact in a brittle fashion (rather than ductile fashion), is a significant limitation on the usefulness of such articles. By "ductile" is meant that cracks in the molded resin are not initiated, or if initiated do not tend to propagate, from the area of impact. A resin having good ductility is one that is resistant to crack propagation caused by impact.

Before now, a variety of additives have been added to polyamide resins to improve strength and ductility. For example, U.S. Pat. No. 4,174,358 issued Nov. 13, 1979 to Epstein, describes improving impact strength and ductility by adding a selected random copolymer which adheres to the polyamide. U.S. Pat. No. 4,594,386 issued Jun. 10, 1986 to Olivier, describes improving impact strength and toughness of polyamide resins by blending polyamide resin with maleic anhydride grafted EPM rubber of low molecular weight. U.S. Pat. No. 4,346,194 issued Aug. 24, 1982 to Roura, describes a polyamide molding material having good impact strength at low temperatures, e.g., 0° C.; the polyamide molding material comprises a nylon 6/66 blend and a toughening copolymer that is an adduct of a polymer of ethylene, at least one $C_3$–$C_6$ α-olefin and at least one nonconjugated diene, with an unsaturated compound containing carboxyl or carboxyl derivatives.

Although the previously known combinations impart improved toughness to polyamide resins, it has now been found that certain novel combinations provide further improvements in polyamide resin toughness at exceptionally low temperatures, e.g., temperatures less than about –40° C. This invention is directed to a polyamide molding blend suitable for making molded articles for use in applications requiring toughness at exceptionally low temperatures.

SUMMARY OF THE INVENTION

The present invention provides a toughened polyamide blend which exhibits unexpectedly good toughness at exceptionally low temperatures, e.g., temperatures less than about –40° C.

Specifically, the present invention provides a toughened polyamide blend comprising:

(A) about 60 to about 90 weight percent, based on the total weight of (A) and (B), of a polyamide matrix resin; and (B) about 10 to about 40 weight percent, based on the total weight of (A) and (B), of a rubber component comprising:
  (1) a functionalized rubber selected from the group consisting of ethylene/propylene copolymers and ethylene/propylene/diene terpolymers; said copolymers and terpolymers containing 0.1–4 weight percent of groups capable of reacting with the amine moieties of the polyamide, and (2) an ethylene copolymer of the formula E/X/Y wherein
  E is a radical formed from ethylene and forms from about 40 to about 90 weight percent of the ethylene copolymer,
  X is an acrylate ester of an alcohol having 1 to 10 carbon atoms and forms from about 10 to about 80 weight percent of the ethylene copolymer, and
  Y is selected from the group consisting of glycidyl methacrylate and glycidyl acrylate and forms from about 0.5 to about 10 weight percent of the ethylene copolymer.

DETAILED DESCRIPTION

Typical matrix polyamides useful in the present invention can be highly or partly crystalline or amorphous, or can themselves be blends of crystalline and amorphous polyamides. They can be made by condensation of substantially equimolar amounts of a saturated aliphatic, aromatic, or cycloaliphatic dicarboxylic acid having from 4 to 12 carbon atoms with a primary or secondary aliphatic or cycloaliphatic diamine having from 4 to 12 carbon atoms. Representative dicarboxylic acids include succinic, adipic, azelaic, sebacic, 1,12-dodecanoic, 1,4-cyclohexanedicarboxylic, terephthalic, and isophthalic. Representative diamines include tetramethylenediamine, pentamethylenediamine, hexamethylenediamine, dodecamethylenediamine, and 1,4-cyclohexanediamine. Other suitable polyamides can be made by homopolymerization, with ring opening, of lactams having from 5 to 13 ring atoms. Representative lactams include γ-valerolactam, ε-caprolactam, ω-laurolactam, etc. Suitable polyamides also include polyamides made by polycondensation of two or more components of the same type, such as, for example, two different dicarboxylic acids with one diamine, or two different diamines with one dicarboxylic acid, or one diamine, one dicarboxylic acid, and one lactam, or a polyamide in which a portion of the dicarboxylic acid is terephthalic acid and another portion is isophthalic acid, etc. Additionally, compatible blends of two or more polyamides may be used, instead of a single polyamide, to form the matrix component of the blend.

Polyamides which can be used in the present invention include those which have a relative viscosity (ratio of solution and solvent viscosities in a capillary viscometer at 25° C. using an 8.4% by weight solution of polymer dissolved in formic acid containing 10% by weight of water) of about 50 or more and preferably at least about 70. Examples of polyamides which can generally be used include polyhexamethylene adipamide (6,6 nylon), poly-ε-caproamide (6 nylon), polyhexamethylene sebacamide (610 nylon), polyhexamethylene dodecanoamide (612 nylon) and polytetramethylene adipamide (4,6 nylon). In general, the polyamides used in the matrix should have a number average molecular weight of at least about 5,000.

As stated above, the polyamides can be either crystalline or amorphous, or blends thereof. For example, blends of nylon 6 and nylon 6,6 will exhibit good performance characteristics when combined with tougheners in accordance with the present invention, as will copolymers of the same polyamides. The preferred polyamides for use in the present invention are nylon 6; nylon 6,6; nylon 6,10 and nylon 6,12. The most preferred polyamide is nylon 6,12.

The polyamide constitutes from about 60 to about 90 percent by weight of the present invention based on the total weight of components (A) and (B). A preferred range for the polyamide is from about 75 to about 90 weight percent polyamide. An even more preferred range for the polyamide is from about 79 to about 88 weight percent polyamide. The most preferred range for the polyamide is from about 80 to about 85 weight percent polyamide.

The functionalized rubbers used in the present invention include functionalized copolymers derived from ethylene and propylene. The ethylene and propylene units in the copolymer each constitute at least about 40 percent by weight of the total of ethylene and propylene units in the copolymer. Other useful functionalized rubbers include functionalized ethylene/propylene/diene terpolymers. In these terpolymers, the units derived from ethylene and propylene each constitute at least about 40 percent by weight based on the weight of the terpolymer and the diene component constitutes up to about 10 percent by weight based on the weight of the terpolymer. In cases where the terpolymers are used, useful diene monomers include unsaturated, branched, straight chain and cyclic compounds having from 4 to 14 carbon atoms and at least one additional conjugated or nonconjugated unsaturated carbon-carbon bond. Such diene monomers can be selected, for example, from hexadiene, norbornadiene, ethylidenenorbornene, dicyclopentadiene, butadiene, isoprene, divinylbenzyl and allylstyrene. These terpolymers, containing a diene component, are typically designated EPDM materials, as described more fully, for example, in Volume 6 of Encyclopedia of Polymer Science and Engineering, Second Edition, John Wiley & Sons, New York (1986), in the section on Ethylene-Propylene Elastomers on pages 522–564, hereby incorporated by reference. Ethylene/propylene (EP) copolymers are preferred in the present invention.

By "functionalized" is meant that the rubbers (copolymers or terpolymers) further comprise from about 0.1 to about 4.0 weight percent of groups capable of reacting with the amine moieties of the polyamide. Such reactive groups can vary widely. Examples include monoesters of alcohols of 1 to 29 carbon atoms or anhydrides of the dicarboxylic acids, or the metal salts of the acids, or the monoester of the dicarboxylic acid having from 0 to 100 percent of the carboxylic acid groups ionized by neutralization with metal basic salt, and the like. Illustrative of such acids and their derivatives are maleic acid, maleic anhydride, maleic acid monoethyl ester, metal salts of maleic acid, monoethyl ester, fumaric acid, fumaric acid monoethyl ester, itaconic acid, vinyl phthalic acid, metal salts of fumaric acid monoethyl ester, monoesters of maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. Of these, those reactive groups derived from maleic anhydride and monoesters of maleic acid, have been found to be particularly preferred. Most preferred, however, are the reactive groups derived from maleic anhydride.

The functionalized rubbers used in the present invention are known in the art and can be prepared by methods known in the art. For example, see U.S. Pat. Nos. 4,594,386 to Olivier and 4,026,967 to Flexman et al.

Also required in the present invention is an ethylene copolymer of the formula E/X/Y where "E" is a radical formed from ethylene and forms from about 40 to about 90, preferably about 50 to about 80, and most preferably about 60 to about 70, weight percent of the ethylene copolymer;

"X" is an acrylate ester of an alcohol having 1 to 10, preferably 1 to 6, and most preferably 4, carbon atoms and forms from about 10 to about 80, preferably about 20 to about 60, and most preferably about 25 to about 55, weight percent of the ethylene copolymer; and "Y" is glycidyl methacrylate or glycidyl acrylate and forms from about 0.5 to about 10, preferably about 2 to about 8, and most preferably about 3 to about 6, weight percent of the ethylene copolymer.

Additional comonomers, including methyl acrylate, can be present in the ethylene copolymer in minor amounts, provided that the essential characteristics of the ethylene copolymer are not substantially altered.

The ethylene copolymers used in the blends of the present invention can be prepared, for example, by direct copolymerization of the E, X and Y comonomers in the presence of a free-radical polymerization initiator at elevated temperatures, preferably 100°–270° C., and most preferably 130°–230° C., and at elevated pressures, preferably at least 70 MPa, and most preferably 140–350 MPa.

The total rubber content in the present invention is from about 10 to 40 weight percent based on the polymer blend. A preferred amount is from about 10 to about 25 weight percent rubber based on the polymer blend. An even more preferred amount is from about 12 to about 21 weight percent rubber and the most preferred amount is from about 15 to about 20 weight percent rubber. Within any of the stated ranges, the weight ratio of functionalized rubber to the E/X/Y rubber should be between 1:1 and 6:1.

In addition to the three basic polymeric components, the present blends can also include one or more conventional additives such as, flame retardants, stabilizers and inhibitors of oxidative, thermal, and ultraviolet light degradation; lubricants and mold release agents, colorants including dyes and pigments, fibrous and particulate fillers and reinforcements, nucleating agents, plasticizers, and the like, each used in the quantities typical in toughened polyamide compositions, as will be known to those skilled in the art.

Representative oxidative and thermal stabilizers which may be present in blends of the present invention include Group I metal halides, e.g., sodium, potassium, lithium with cuprous halides, e.g., chloride, bromide, iodide; hindered phenols, hydroquinones, and varieties of substituted members of those groups and combinations thereof.

Representative ultraviolet light stabilizers, include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like.

Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like.

The blends of the present invention are typically prepared by physically admixing the components in the indicated proportions, so as to provide a particle size of the toughening phase of from about 0.01 to about 3 microns, and preferably from about 0.1 to about 2 microns. Conventional polymer processing equipment can be used, such as multi-screw extruders, or other conventional plasticating devices such as high shear mills, so long as the applied shear is sufficient to provide the required small particle size and without significant degradation of the blend components. In the alternative, the polymer blends can be made by coprecipitation from solution, blending or by dry mixing the components together followed by melt fabrication of the mixture.

EXAMPLES

Three blends were prepared as described below and certain properties tested using a Rheometrics™ impact testing apparatus. The results are shown in the table below.

The blends (compositions shown in table) below were prepared from 612 nylon with a number average molecular weight of 21,000. The functionalized rubber was an amorphous ethylene-propylene copolymer with 40% propylene units, as indicated by infrared analysis, and had a concentration of about 0.7% grafted maleic anhydride units. The E/X/Y ethylene terpolymer had 30% n-butyl acrylate and 5% glycidyl methacrylate with a melt index of 70 g. per 10 minutes.

The blends below were prepared using a 2mm Werner & Pfleiderer co-rotating twin screw extruder. The screws were set up with two sets of kneading blocks followed by reverses and a vacuum port was used. The extruder was run at 200 r.p.m. with the barrel temperatures set at 240° C. The extrusion rate was 36–37 pounds per hour and the extruded strands were cut into approximately ⅛-inch molding pellets.

The pellets were dried in a vacuum oven overnight at approximately 80° C. with a slow nitrogen stream prior to molding. The pellets were then molded into test specimens using a 6-oz. Van Dorn reciprocating screw injection molding machine with a general purpose screw. The mold was a ⅛-inch thick disk with a 4-inch diameter. The barrel was set at 240° C. and the mold at 90° C. A 45-second screw forward time per 15-second hold time was used. The injection pressure was 6,900 psi with a 50 psi back pressure.

The Rheometrics™ impact testing apparatus was used with a 3-inch ring to hold the test specimens in place and a 0.5-inch TUP (diameter) on the impacting piston. The speed was 10,560 inches per minute (10 miles per hour). The specimens were conditioned to 50% relative humidity prior to testing by boiling them in a solution of 125 parts of potassium acetate in 100 parts of water for 24 hours. Water acts as an anti-plasticizer at temperatures well below freezing and will be present in any end use applications. Shown in the Table are the compositions for each blend, the total energy required to break a specimen at −40° C., and the average total energy required to break three specimens at −51° C.

TABLE

| Ex. No. | % Polyamide | % Functional Rubber | % E/BA/ GMA | −40° C. E in.lb | −51° C. Ave. E in.lb |
|---|---|---|---|---|---|
| Control | 85 | 15 | 0 | 469 | 332 |
| 1 | 85 | 12 | 3 | 508 | 484 |
| 2 | 85 | 9 | 6 | 474 | 515 |

As can be seen from the data presented in the Table, the blends having both rubber components present (i.e., Examples 1 and 2) exhibited sightly improved toughness at −40° C. and substantially improved toughness at −51° C. as compared to the blend containing only the functionalized rubber (i.e., Control).

What is claimed is:

1. A polymer blend comprising components (A) and (B):

(A) about 60 to 90 weight percent, based on the total weight of (A) and (B), of a polyamide matrix resin selected from the group consisting of nylon 6, nylon 6,6; nylon 6,10 and nylon 6,12; and (B) about 10 to about 40 weight percent, based on the total weight of (A) and (B), of a rubber component comprising;

(1) a functionalized rubber selected from the group consisting of ethylene/propylene copolymers and ethylene/propylene/diene terpolymers; said copolymers and terpolymers containing 0.1 to 4 weight percent of groups capable of reacting with the amine moieties of the polyamide, and (2) an ethylene copolymer of the formula E/X/Y wherein E is a radical formed from ethylene and forms about 40 to about 90 weight percent of the ethylene copolymer, X is a radical formed from an acrylate ester of an alcohol having 1 to 6 carbon atoms and forms about 10 to about 80 weight percent of the Y is a radical selected from the group consisting of a radical formed from glycidyl methacrylate and a radical formed from glycidyl acrylate and forms about 0.5 to about 10 weight percent of the ethylene copolymer.

2. The polymer blend of claim 1 comprising about 75 to about 90 weight percent of the polyamide matrix and about 10 to about 25 weight percent of the rubber component based on the total weight of (A) and (B).

3. The polymer blend of claim 1 comprising about 79 to about 88 weight percent of the polyamide matrix and about 12 to about 21 weight percent of the rubber component based on the total weight of (A) and (B).

4. The polymer blend of claim 1 comprising about 80 to about 85 weight percent of the polyamide matrix and about 15 to about 20 weight percent of the rubber component based on the total weight of (A) and (B).

5. The polymer blend of claim 1 wherein E is a radical formed from ethylene; X is a radical formed from butyl acrylate; and Y is a radical formed from glycidyl methacrylate.

6. The polymer blend of claim 1 further comprising at least one additive selected from the group consisting of flame retardants; stabilizers and inhibitors of oxidative, thermal, and ultraviolet light degradation; lubricants and mold release agents; colorants; fibrous and particulate fillers and reinforcements; nucleating agents; and plasticizers.

7. Molded articles prepared from the polymer blend of claim 1 intended for applications requiring good impact strength at a low temperature.

* * * * *

UNITED STATES PATENT AND TRADEMARK OFFICE
CERTIFICATE OF CORRECTION

PATENT NO. : 5,670,575
DATED : Sept. 23, 1997
INVENTOR(S) : Flexman, Jr.

It is certified that error appears in the above-identified patent and that said Letters Patent is hereby corrected as shown below:

Column 6, line 28, after "percent of the" add:

-- ethylene copolymer, and --

Signed and Sealed this

Twentieth Day of October, 1998

*Attest:*

BRUCE LEHMAN

*Attesting Officer*  *Commissioner of Patents and Trademarks*